United States Patent [19]
Nobusawa

[11] 3,800,683
[45] Apr. 2, 1974

[54] SHUTTER CONTROL CIRCUITRY FOR CAMERAS

[75] Inventor: Tsukumo Nobusawa, Tokyo, Japan

[73] Assignee: Asahi Kogaku Kogyo Kaisha, Tokyo-to, Japan

[22] Filed: Sept. 25, 1972

[21] Appl. No.: 291,974

[52] U.S. Cl. .............................................. 354/51
[51] Int. Cl. ........................................... G03b 7/08
[58] Field of Search .................. 95/10 CT; 307/238

[56] References Cited
UNITED STATES PATENTS

| | | | |
|---|---|---|---|
| 3,390,273 | 6/1968 | Weckler | 95/10 UX |
| 3,712,192 | 1/1973 | Ono et al. | 95/10 |
| 3,641,890 | 2/1972 | Ono | 95/10 |

Primary Examiner—Samuel S. Matthews
Assistant Examiner—Michael L. Gellner
Attorney, Agent, or Firm—Steinberg & Blake

[57] ABSTRACT

A single lens reflex camera in which a signal corresponding to the intensity of the light at the object which is photographed is interrupted during exposure of film. The circuitry which controls the shutter of the camera has a field effect transistor for storing this latter signal. An erasing circuitry is electrically connected with the field effect transistor for erasing at least part of a signal stored thereby and retained upon closing of a shutter of the camera to complete an exposure.

15 Claims, 5 Drawing Figures

TO THE BASE OF TRANSISTOR 8

TO CONTACT C

SHUTTER CONTROL CIRCUITRY FOR CAMERAS

BACKGROUND OF THE INVENTION

The present invention relates to cameras.

In particular, the present invention relates to single lens reflex cameras in which a circuit is provided for automatically determining the exposure time in accordance with parameters such as intensity of the light at the object which is to be photographed, film speed, and preselected diaphragm aperture.

As is well known, when a camera of this type measures light after the light has travelled through the objective of the camera, the light measurement is made by reflecting th light from the objective to a photosensitive element situated at the region of the viewfinder of the camera, this reflection of light being brought about in part by way of the tiltable mirror which directs the image of the object to be photographed up into the viewfinder. In order to make an exposure this mirror is conventionally swung to a position where it no longer extends across the optical axis, so that the light can then travel through the objective to the film in order to expose the latter when the shutter opens. However, this swinging of the mirror to a position where it no longer extends across the optical axis also interrupts the transmission of light from the object to the photosensitive element which measures the intensity of the light at the object, and as a consequence the signal according to intensity of the light at the object to be photographed is necessarily interrupted during film exposure.

Therefore, it is conventional to provide the shutter-controlling circuitry of such cameras with structure which will store the signal according to light intensity so that this latter signal will be available for controlling the duration of the exposure time. For this purpose it is conventional to utilize a capacitor which receives a charge in accordance with the light intensity and which stores this charge so that it may be used for controlling the exposure time. Such an arrangement is disclosed, for example, in U.S. Pat. No. 3,324,779. In accordance with this circuitry, where a capacitor is used for memory purposes, the capacitor is electrically connected with a field effect transistor which functions as a transistor of high input impedance utilized to maintain the stored information. However, such a memory capacitor clamps the gate voltage of the field effect transistor, with the result that the stored electrical charge is gradually consumed with the passage of time as a leakage current at the gate.

In order to improve the storing effect, it is preferred to use a memory capacitor of larger capacity. With a shutter-control circuit of the above type it is required that the memory or signal-storing means follow up the variations in light intensity of the object which is to be photographed, and from this latter standpoint the use of a memory capacitor is highly advantageous since it is possible for the charge stored in the memory capacitor to be subjected partially to charging or discharging in response to variations in light intensity detected by a photsensitive element from the object which is to be photographed. This follow-up type of operation of such a memory capacitor, in response to variations in light intensity at the object which is to be photographed, improves in an inverse proportion to the capacity of the capacitor. Thus, while it is desired to increase the capacity of the capacitor so as to improve its storing operation, it is at the same time desired to decrease the capacity of this capacitor so as to improve its effectiveness in following up changes in light intensity, and therefore the requirements of such a conventional memory capacitor conflict with each other and have always created a problem in selection of the capacity of the memory capacitor which is to be incorporated into the shutter-control circuitry.

SUMMARY OF THE INVENTION

It is accordingly a primary object of the present invention to provide a shutter-control circuit which will avoid the above drawbacks.

In particular, it is an object of the present invention to replace a conventional memory capacitor with an electrical component which has a signal-storing function and light-intensity follow-up function which do not conflict with each other so that both signal-storing and follow-up of fluctuations in light-intensity can be carried out in a highly efficient manner far beyond what has heretofore been possible with a conventional storage capacitor.

It is furthermore an object of the present invention to provide a structure of the above type with a means capable of effectively erasing a stored signal upon completion of an exposure, so that there will be no residual storage signal to affect a subsequent exposure in an undesirable manner.

An additional object of the present invention is to prevent creation of any excessive erasing signal used for erasing a previously stored signal.

A further object of the present invention is to provide a shutter control circuit which is simple and inexpensive while at the same time being capable of achieving the desired results in a highly effective manner.

According to the present invention a single lens reflex camera is provided with a photosensitive means for responding to intensity of light at the object to be photographed in order to provide a signal corresponding to this light intensity. The camera is of the type which interrupts transmission of light from the object to be photographed to the photosensitive means during exposure of film in the camera. A field effect transistor means is electrically connected with the photosensitive means to receive therefrom the signal according to the intensity of the light and to store this signal. A shutter-control circuit means is electrically connected with the field effect transistor means for responding to the signal stored thereby in order to determine the exposure time.

BRIEF DESCRIPTION OF DRAWINGS

The invention is illustrated by way of example in the accompanying drawings which form part of this application and in which.

DESCRIPTION OF PREFERRED EMBODIMENTS

According to the present invention the storage capacitor conventionally utilized in shutter-control circuits is replaced by a field effect transistor means which has a signal-storing or memory effect. Such a field effect transistor is disclosed, for example, in U.S. Pat. Nos. 3,350,610 and 3,307,089. Such a field effect transistor is used to avoid the above disadvantages encountered in conventional shutter-control circuits which utilize memory capacitors.

Figure 1:
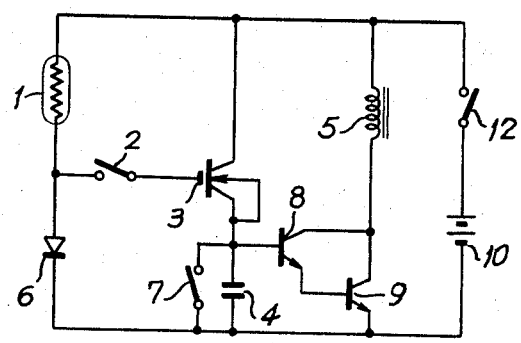
FIG. 1 is a wiring diagram illustrating the basic circuitry of the invention.

Referring to FIG. 1 which shows the basic circuitry of the invention, light which travels through the objective of the camera is received by a photosensitive means 1, and this photosensitive means 1 provides a signal in the form of a voltage whose magnitude corresponds to the light intensity of the object which is to be photographed, this signal being transmitted through a normally closed switch 2 to the gate electrode of a field effect transistor means 3 which has a signal-storing operation so that a memory effect will be achieved by the field effect transistor means 3. As is well known when the tiltable mirror is swung up, the transmission of light to the photosensitive means 1 will be interrupted. This operation takes place in synchronism with opening of the shutter, and at the same time, which is to say in synchronism with opening of the shutter, the switch 2 opens.

A shutter-control circuit means is electrically connected to the field effect transistor means 3 in order to determine the exposure time in accordance with the signal stored by the field effect transistor means 3, and this shutter-control circuit means includes a timing capacitor 4 which is connected in series with the field effect transistor means 3 in an electrical circuit which has its current controlled by the field effect transistor 3. The shutter control circuit means includes an electromagnet means 5 which when energized will initiate closing of the shutter, and energizing of the electromagnet means 5 is brought about by way of a switching circuit means 8, 9, as well as an unillustrated current amplifier circuit, if one is required. The switching circuit means 8, 9 responds to the terminal voltage of the timing capacitor 4.

Connected in series with the photosensitive means 1 is a logarithmic compression diode 6. The timing capacitor 4 is bypassed by a short-circuiting switch 7 connected in parallel with the timing capacitor 4. As is well known, this switch 7 is opened in synchronism with the opening of the shutter, so that charging of the timing capacitor 4 is initiated upon opening of the shutter. The switching circuit means 8, 9, formed by the transistors 8 and 9, will respond when the charge at the capacitor 4 reaches a given value in order to energize the electromagnet means 5. The circuitry includes a battery 10 serving as a source of current and a switch 12 for closing the entire circuit. This switch 12 will be closed during an initial part of the depression of the shutter-operating button of the camera, as is well known. The particular field effect transistor 3 utilized in the circuitry of FIG. 1 for its memory or storage effect may be that disclosed in U.S. Pat. No. 3,307,089.

With the above structure of FIG. 1, when the switch 12 is closed, as by an initial portion of the movement of the shutter-tripping plunger of the camera, both of the switches 2 and 7 are in their closed positions and the operator directs the camera toward the object which is to be photographed. At this time the photosensitive means 1 receives light from the object to be photographed, this light travelling first through the objective of the camera, and the output of the photosensitive means 1 is logarithmically compressed by the diode 6, with the corresponding signal being transmitted to the field effect transistor 3 through the closed switch 2, this signal received by the field effect transistor means 3 being stored thereby. The signal is stored at the field effect transistor means 3 in the form of a voltage having a magnitude corresponding to the intensity of the light. This stored voltage corresponds to the gate clamp voltage of the field effect transistor 3, so that a corresponding control of exposure time will be achieved. As was indicated above, the switches 2 and 7 are opened in synchronism with opening of the shutter, in response to the continued movement of the shutter-tripping plunger after closing of the switch 12, and opening of the switch 7 will cause the timing capacitor 4 to receive a charge corresponding to the signal stored by the field effect transistor 3. The electromagnet means 5 may either be energized to release the trailing curtain of the shutter or the trailing curtain may be retained in its cocked position while the electromagnet is energized and released for closing movment when the electromagnet means 5 is deenergized. Thus, assuming this latter type of operation, when the charge of the timing capacitor 4 reaches a given value the switching circuit means 8, 9 will bring about deenergizing of the electromagnet means 5 so as to initiate the shutter-closing operations. The instant when the timing capacitor 4 reaches the charge which will trigger the switching circuit means 8, 9 depends upon the particular internal resistance of the field effect transistor 3 and the particular capacity of the timing capacitor 4, the switch 2 being opened during the initial part of movement of the shutter-tripping button or plunger as pointed out above, just prior to opening of the shutter to start the exposure.

Thus, with this basic structure of the invention it is possible to replace a conventional memory capacitor with a field effect transistor which will have the desired memory function and which is capable of operating the timing circuit to determine the exposure time in the manner described above. Taking into consideration, however, the fact that the circuitry of FIG. 1 will under ordinary circumstances be used repeatedly since in the operation of a camera exposures are frequently made one directly after another, it is desired to provide an erasing means to erase from the field effect transistor 3 any signal stored therein during the previous exposure so that during each exposure there will be no undesirable influence from storing of a signal from a previous exposure at the field effect transistor means 3. FIGS. 2-5 show different embodiments of the invention which include an erasing means which is added to the basic circuitry shown in FIG. 1.

Figure 2:
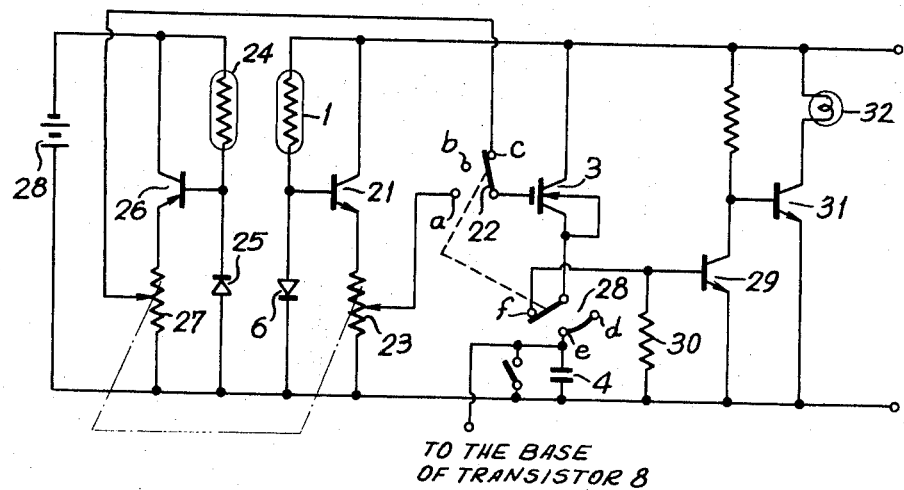
FIG. 2 is a wiring diagram illustrating one embodiment of an erasing means used with the basic circuitry to erase a stored signal.

Referring to FIG. 2, this embodiment has an erasing means which operates by applying to the field effect transistor means 3 an erasing voltage which may be at least approximately equal to the initial signal-transmitting voltage but which has an opposite polarity so as to erase the previously stored signal, or any part thereof, in a fully effective manner. For this purpose, the circuitry shown in FIG. 2 includes a switch means 22 which is displaced between three contacts $a$, $b$, and $c$. Thus, this switch means 22 has three positions where the switch is in engagement with one of the latter three contacts. When the switch 22 is closed at the contact a the photosensitive means referred to above is connected through the illustrated circuitry to the field effect transistor means 3 in order to transmit to the latter a signal corresponding to intensity of the light at the object which is to be photographed. Thus, this circuitry of FIG. 2 also includes the photosensitive means 1 and the diode 6 which are connected in series, with a signal corresponding to light intensity at the object to be photographed being developed across the electrodes of the diode 6 and applied to the base electrode of an amplifying transistor 21 in the form of a value obtained from logarithmic compression of the light intensity value. The transistor 21 is connected with an emitter resistance 23 having the construction of a potentiometer to provide a divided voltage which is adjustable in accordance with the speed of the film which is used. This divided output corresponds to the input signal transmitted to the field effect transistor means 3 and determining the magnitude of the electrical quantity stored thereby to be utilized for charging the timing capacitor 4.

When the switch 22 is displaced from contact a into engagement with contact b, the situation is the same as that which occurs upon opening of the switch 2 of FIG. 1, and thus the stored information is retained by the field effect transistor means 3 even when the mirror is swung up just prior to exposure with the resulting interruption in the transmission of light to the photosensitive means 1. Thus, this is the position of the switch means 22, namely in engagement with contact b, immediately before, during, and immediately after shutter-control operation.

Immediately after closing of the shutter, the switch means 22 is displaced into engagement with contact c, and this operation may be brought about automatically by way of any suitable transmission from the shutter to the switch means 22 in such a way that when the trailing curtain of the shutter runs down to its shutter-closing position, to terminate an exposure, this condition is transmitted to the switch 22 in order to place the latter in engagement with contact c. This latter position where the switch 22 engages the contact c is the erasing position of the switch means 22 when the erasing means of FIG. 2 is effective for erasing the previously stored signal. Thus, under these conditions a voltage of polarity opposite to that of the signal stored by the field effect transistor 3 is applied to the latter through the contact c.

The erasing means of FIG. 2 includes an amplifying transistor 26 receiving between its base and emitter the interpole voltage of the diode 25 which forms part of a series circuit made up of a second photosensitive means 24 which receives light from the object to be photographed and the diode 25, the erasing means further including an emitter resistance 27 connected to the amplifier transistor 26, and a battery source 28 arranged as a circuit whose polarity is opposite to that of the circuit means which connects the photosensitive means 1 to the field effect transistor means 3 when the switch 22 engages the contact a. Accordingly, a voltage which will have an erasing function and which is of a polarity opposite to the signal-transmitting polarity is applied at the contact c which is connected to the divided voltage output terminal of the emitter resistance 27 which is constructed as a potentiometer. In this way the field effect transistor means 3 is released from its condition storing the information from the previously transmitted signal, in response to application of the erasing voltage to the gate electrode of the field effect transistor means 3.

It is theoretically possible to erase the signal stored by the field effect transistor 3 in a perfect manner by providing an arrangement according to which both of the photosensitive means 1 and 24 receive equal amounts of light from the object to be photographed, with both of the emitter resistances 23 and 27 operatively connected to each other so as to always have the same resistance values, respectively, and with the erasing circuit and the signal-transmitting circuit both having the same circuit requirements inasmuch as the voltage used for erasing purposes and the voltage used for signal-transmission purposes have the very same value even though they are of opposite polarities. In practice, however, the voltage utilized for erasing purposes must be adjusted to some extent because of the presence of a possible error in the output of the erasing circuit and because of the possiblity of a limited erasing efficiency at the field effect transistor 3. Therefore, the structure of FIG. 2 is provided with an adjusting means according to which the resistance value of the potentiometer 27 is adjusted in accordance with the extent to which the voltage for erasing purposes must be adjusted. Afte this adjustment is provided at the potentiometer 27 in order to bring about a highly effective erasing function the potentiometer 27 is coupled mechanically to the potentiometer 23, so that when the latter is adjusted the potentiometer 27 will maintain its adjusted relationship with respect to the potentiometer 23.

In addition, the embodiment of the invention which is illustrated in FIG. 2 includes an indicating means for indicating to the operator that the effective erasing of the stored signal has been achieved. This indicating means includes a switch 28 inserted in the connection between the field effect transistor 3, the source electrode, and the capacitor 4. This switch means 28 has three positions respectively engaging the contacts d, e and f, with the switches 22 and 28 being connected to each other so that when the switch 22 engages the contacts a, b and c, the switch 28 is respectively in engagement with the contacts d, e and f. However, it will be seen that the contacts d and e are permanently connected to each other so that the field effect transistor 3 is connected electrically with the capacitor 4 through the switch 28 when the switch 22 engages the contacts a and b. Thus, these contacts d and e provide a circuit serving to connect the source electrode of field effect transistor 3 to capacitor 4 in the manner described above in connection with FIG. 1.

The contact f is connected to the base electrode of a transistor 29 having a base bias resistor 30. The base electrode of a following transistor 31 is connected to the collector electrode of transistor 29, and a display or indicating lamp 32 is inserted into the collector electrode side of the transistor 31. This indicating lamp of the indicating means of this embodiment is adapted to be illuminated or extinguished according to the value of the voltage present at the contact f. When the contact f is connected to the source electrode of field effect transistor 3 upon engagement of the switch 28 with the contact f, a voltage whose magnitude depends upon the internal resistance of the transistor 3 will be present at the contact f. This voltage which is present at the contact f when the resistance value of transistor 3 is relatively low, in accordance with the stored signal, will result in illumination of the lamp 32. When there is a relatively low voltage at the contact f, upon erasing of the stored signal at the transistor 3, or in other words when the internal resistance of transistor 3 reaches an extremely high level, then the lamp 32 will be extinguished, and the operator will know through this indicating means that the erasing function has been completed.

The controlling of the exposure time by way of operation of the shutter-control circuit through the field effect transistor means 3 of FIG. 2 takes place similarly to the above-described embodiment of FIG. 1. Thus, FIG. 2 indicates how the capacitor 4 is electrically connected to the transistor 8 of FIG. 1. An additional transistor may be used in the embodiment of FIG. 2 solely in order to provide a more reliable switching operation.

Figure 3:
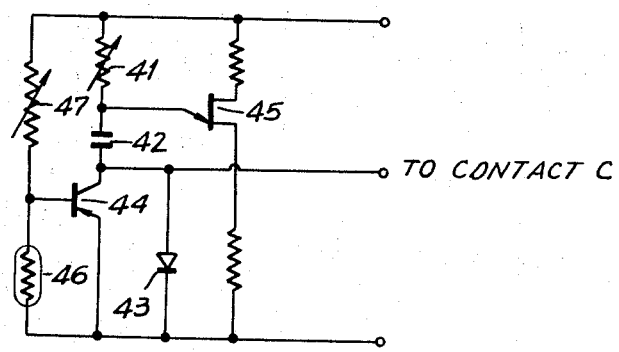
FIG. 3 is a wiring diagram of a further embodiment of an erasing means.

Referring now to FIG. 3, the erasing means illustrated therein is in the form of a pulse-circuit means which provides a pulse voltage to bring about the erasing function. For this purpose the pulse-circuit means of FIG. 3 includes a variable resistor 41 connected in series with a capacitor 42 which is in turn connected in series with a diode 43, so as to form in this way an RC timing circuit means.

The pulse circuit means of FIG. 3 further includes a transistor 44 having its collector and emitter electrodes connected to the electrodes of the diode 43. In addition the circuit includes a unijunction transistor 45 connected so as to have the terminal voltage of capacitor 42 applied across the base and emitter of the unijunction transistor 45. The discharge circuit of capacitor 42 is arranged in such a way that when the terminal voltage of capacitor 42 reaches a given value electric current flowing across the emitter and base of transistor 45 will flow across the emitter and collector of transistor 44 to the other electrode of the capacitor 42. The divided voltage output from the series circuit consisting of the photosensitive means 46 which receives light from the object to be photographed and the variable resistor 47 is applied to the base electrode of the transistor 44.

With operation of the erasing means formed by the pulse circuit means of FIG. 3, the capacitor 42 is charged with current flowing through the variable resistor 41 and the diode 43. When the terminal voltage of the capacitor 42 reaches a given value resulting from this charging thereof, the unijunction transistor 45 is transferred into its state of continuity or conductivity, and the electrical current flowing across the emitter and base of the unijunction transistor 45 flows across the emitter and collector of the transistor 44 under the influence of the internal resistance of the transistor 44. The duration of conductivity of the unijunction transistor 45 corresponds to the duration of the emitter current thereof. This emitter current is a limited electrical charge provided at the capacitor 42, so that the duration of continuity of conductivity of the unijunction transistor 45 is regulated by regulating the capacitor charging current which flows through the unijunction transistor 45 by way of the transistor 44.

The voltage at the collector electrode of the transistor 44 is applied to the contact c of the embodiment of FIG. 2, as indicated in FIG. 3, so as to provide the pulse which will erase the signal stored at the field effect transistor 3 with the voltage pulsation transmitted by the pulse circuit means of FIG. 3 to the contact c.

In the embodiment of FIG. 3, the resistance value of the variable resistor 41 affects the cycle at which the unijunction transistor 45 transfers into its state of conductivity while the resistance value of the variable resistor 47 affects the duration of the conductivity of the transistor 45, or in other words the pulse width.

The resistance value of the photosensitive means 46 varies in accordance with the intensity of the light at the object to be photographed and affects the pulse width. Thus, in this way the signal in accordance with the light intensity at the object to be photographed which has previously been stored at the field effect transistor 3 will be erased. It is possible to replace the variable resistor 47 with a diode in the embodiment of FIG. 3.

Figure 4:
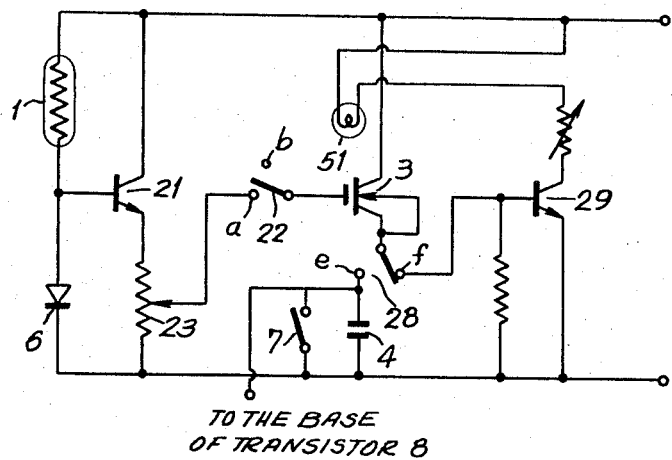
FIG. 4 is a wiring diagram illustrating yet another embodiment of an erasing means of the invention.

According to the embodiment of the erasing means of the invention which is shown in FIG. 4, the field effect transistor means 3, which is responsive to light in order to have the signal erased therefrom, is situated in the path of light issuing from the lamp 51 so that through this lamp 51 it is possible to erase the stored signal by application of light to the field effect transistor 3. Thus, it will be seen that the indicating lamp 32 of FIG. 2 is replaced in the embodiment of FIG. 4 by a lamp 51 which functions as an erasing lamp. As will be understood from the above description of FIG. 2 in connection with the lamp 32, the erasing lamp 51 of FIG. 4 will be illuminated until the stored information has been effectively erased. The erasing lamp 51 is situated adjacent to the field effect transistor means 3, and light rays which issue from the illuminated erasing lamp 51 are applied directly to the trnaistor means 3 so as to erase the signal stored thereby. This erasing effect will continue as long as light rays from the lamp 51 are applied to the transistor 3. The erasing lamp becomes automatically extinguished upon completion of the erasing process, this extinguishing of the lamp 51 taking place automatically in the manner described above in correspondence with the change in the internal resistance of the transistor 3 during elimination of the signal therefrom.

Figure 5:
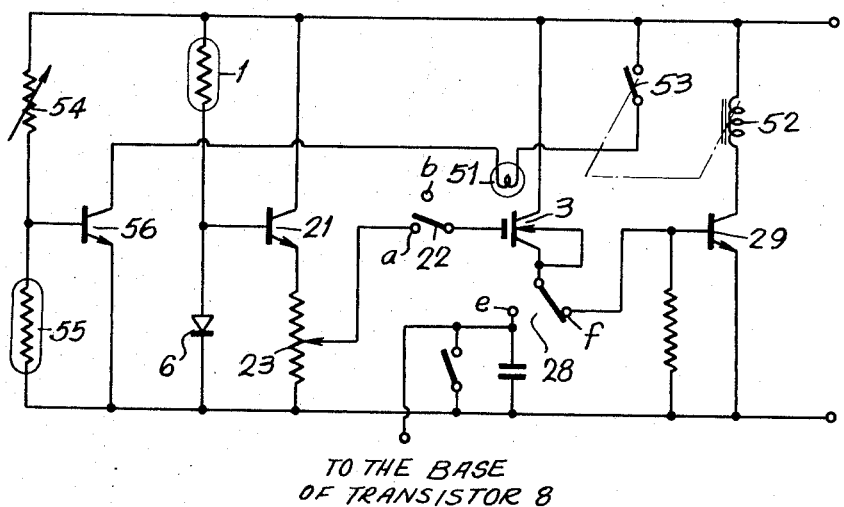
FIG. 5 is a wiring diagram illustrating a further embodiment of an erasing means of the invention.

With the embodiment of FIG. 5, considerable advantage is achieved because the intensity of the erasing lamp 51 can easily be adjusted in accordance with the magnitude of the stored signal which is to be erased from the transistor 3. With the embodiment of FIG. 5 there is an electromagnet 52 which is adapted to be energized when the field effect transistor 3 has a signal of a given magnitude stored therein. The electromagnet 52 controls a switch 53 which thus responds to the state of the field effect transistor 3. The switch 53 is connected in series with he erasing lamp 51. In addition, the collector and emitter of a transistor 56 are connected in series with the lamp 51. The interpole resistance across the collector and emitter of transistor 56 depends upon the divided potential provided by way of the variable resistor 54 and the photosensitive means 55. This photosensitive means 55 is adapted to receive light from the object to be photographed, so that the intensity of the light issuing from the erasing lamp 51 is in accordance with the light intensity of the photographed object detected by the photosensitive means 55, and the lamp 51 will in this case also remain illuminated until completion of the erasing process.

Thus, as is apparent from the above description of FIGS. 2-5, there are two basic techniques used for erasing the signals stored in the field effect transistor means 3 which has a memory function. The first technique involves applying to the field effect transistor 3 a signal similar to that stored therein by having an opposite polarity, while the second technique utilizes the application of light rays directly to the transistor 3. In both cases the signal used for erasing should not be excessive. For this purpose the erasing signal is equivalent to that used during transmission of the signal which is initially stored or the erasing signal is interrupted upon completion of the erasing process.

As is apparent from the above description, the structure of the present invention enables conventional memory capacitors to be replaced with the field effect transistor being used in a shutter control circuit which except for the memory capacitor may be substantially conventional, the field effect transistor being utilized in the shutter-control circuitry of the invention to store the signal corresponding to the intensity of the light at the object to be photographed. Thus, this field effect transistor will have in itself the memory function enabling a memory effect or a charge-storing effect to be achieved, with this effect occurring at a mixed layer of the transistor which at the same time has a rapid follow-up characteristic utilized with the highest degree of efficiency so that the signal stored with the structure of the invention is improved to the maximum while at the same time the structure utilized for this purpose is extremely simple.

What is claimed is:

1. For use in a single lens reflex camera, photosensitive means for responding to intensity of light at an object which is to be photographed to provide prior to exposure of film a signal corresponding to said light intensity, the camera being of the type which interrupts the transmission of light from the object to said photosensitive means during exposure of film, field effect transistor means electrically connected with said photosensitive means for receiving said signal therefrom and for storing said signal in the form of an electrical quantity whose magnitude corresponds to said light intensity, so that a capacitor is not required to store said signal, and shutter control means electrically connected to said field effect transistor means for responding to the magnitude of said electrical quantity to maintain a shutter of the camera open for a length of time corresponding to said magnitude.

2. The combination of claim 1 and wherein said electrical quantity is a voltage the magnitude of which is in accordance with said light intensity, said shutter control means including a timing capacitor connected in series with said field effect transistor means and switch means electrically connected with said field effect transistor means and said timing capacitor for disconnecting said field effect transistor means from said photosensitive means and for rendering said timing capacitor operative in synchronism with the opening of a shutter of the camera.

3. The combination of claim 2 and wherein said shutter control means includes an electromagnet means for initiating closing of a shutter of the camera when the charge of said timing capacitor reaches a given value and said shutter control means including a switching circuit means electrically connected between said timing capacitor and said electromagnet means for operating the latter to initiate closing of the shutter when the charge at said timing capacitor reaches said given value.

4. The combination of claim 1 and wherein an erasing means is electrically connected with said field effect transistor means for erasing at least part of said signal stored thereby and retained upon closing of a shutter of the camera to complete an exposure.

5. The combiantion of claim 4 and wherein said erasing means is in the form of a pulse circuit means for providing a signal-erasing pulse and for transmitting said pulse to said field-effect transistor means for erasing said signal stored thereby.

6. For use in a single lens reflex camera, photosensitive means for responding to intensity of light at an object which is to be photographed to provide prior to exposure of film a signal corresponding to said light intensity, the camera being of the type which interrupts the transmission of light from the object to said photosensitive means during exposure of film, field effect transistor means electrically connected with said photosensitive means for receiving said signal therefrom and for storing said signal in the form of an electrical quantity whose magnitude corresponds to said light intensity, shutter control means electrically connected to said field effect transistor means for responding to the magnitude of said electrical quantity to maintain a shutter of the camera open for a length of time corresponding to said magnitude, and an erasing means electrically connected with said field effect transistor means for erasing at least part of said signal stored thereby and retained upon closing of a shutter of the camera to complete an exposure, said photosensitive means forming a first photosensitive means, a first circuit means electrically connected between said first photosensitive means and said field effect transistor means for transmitting said signal thereto to be stored thereby, said erasing means including a second photosenstive means and a second circuit means electrically connected with said second photosensitive means for transmitting therefrom a signal substantially identical with that transmitted by said first photosensitive means but having an opposite polarity, and switch means electrically connected with said field effect transistor means and with said first and second electrical circuit means for electrically connecting said first circuit means to said field effect transistor means in preparation for an exposure and for electrically connecting said second circuit means to said field effect transistor means upon completion of an exposure for erasing from said field effect transistor means the signal stored thereby and received from said first photosensitive means through said first circuit means.

7. The combination of claim 6 and wherein an adjusting means is electrically connected with said first and second circuit means for adjusting said second circuit means with respect to said first circuit means to achieve an effective signal-erasing effect when said second circuit means is electrically connected by said switch means to said field effect transistor means.

8. For use in a single lens reflex camera, photosensitive means for responding to intensity of light at an object which is to be photographed to provide prior to exposure of film a signal corresponding to said light intensity, the camera being of the type which interrupts the transmission of light from the object to said photosensitive means during exposure of film, field effect transistor means electrically connected with said photosensitive means for receiving said signal therefrom and for storing said signal in the form of an electrical quantity whose magnitude corresponds to said light intensity, shutter control means electrically connected to said field effect transistor means for responding to the magnitude of said electrical quantity to maintain a shutter of the camera open for a length of time corresponding to said magnitude, and an erasing means electrically connected with said field effect transistor means for erasing at least part of said signal stored thereby and retained upon closing of a shutter of the camera to complete an exposure, an indicating means being electrically connected with said erasing means for indicating to the operator when effective erasing of said signal has been achieved.

9. The combination of claim 6 and wherein said indicating means includes a lamp and circuit means connected between said lamp and said field effect transistor means for illuminating said lamp during operation of said erasing means before effective erasing of said signal has been achieved and for extinguishing said lamp when effective erasing of said signal has been achieved.

10. For use in a single lens reflex camera, photosensitive means for responding to intensity of light at an object which is to be photographed to provide prior to exposure of film a signal corresponding to said light intensity, the camera being of the type which interrupts the transmission of light from the object to said photosensitive means during exposure of film, field effect transistor means electrically connected with said photosensitive means for receiving said signal therefrom and for storing said signal in the form of an electrical quantity whose magnitude corresponds to said light intensity, shutter control means electrically connected to said field effect transistor means for responding to the magnitude of said electrical quantity to maintain a shutter of the camera open for a length of time corresponding to said magnitude, and an erasing means electrically connected with said field effect transistor means for erasing at least part of said signal stored thereby and retained upon closing of a shutter of the camera to complete an exposure, said erasing means being in the form of a pulse circuit means for providing a signal-erasing pulse and for transmitting said pulse to said field-effect transistor means for erasing said signal stored thereby, said pulse circuit means including an RC timing circuit means, a second photosensitive means for receiving light from the object to be photographed and electrically connected with said RC timing circuit means for regulating the pulse provided by said pulse circuit means in accordance with said light intensity, and unijunction transistor means electrically connected with said RC timing circuit means for controlling operation of said RC timing circuit means.

11. The combination of claim 10 and wherein said pulse circuit means includes an adjusting means for adjusting the timing and width of the pulse transmitted by said pulse circuit means to said field effect transistor means.

12. For use in a single lens reflex camera, photosensitive means for responding to intensity of light at an object which is to be photographed to provide prior to exposure of film a signal corresponding to said light intensity, the camera being of the type which interrupts the transmission of light from the object to said photosensitive means during exposure of film, field effect transistor means electrically connected with said photosensitive means for receiving said signal therefrom and for storing said signal in the form of an electrical quantity whose magnitude corresponds to said light intensity, shutter control means electrically connected to said field effect transistor means for responding to the magnitude of said electrical quantity to maintain a shutter of the camera open for a length of time corresponding to said magnitude, and an erasing means electrically connected with said field effect transistor means for erasing at least part of said signal stored thereby and retained upon closing of a shutter of the camera to complete an exposure, said field effect transistor means responding to light for erasing said signal therefrom, said erasing means including a lamp for directing light to said field effect transistor means when said lamp is illuminated and a circuit means connected between said field effect transistor means and said lamp for energizing the latter until an effective erasing of said signal has been achieved.

13. The combination of claim 12 and wherein a switch means is electrically connected in said circuit between said field effect transistor means and said lamp for completing the circuit to the latter in response to presence at said field effect transistor means of a signal remaining to be erased.

14. The combination of claim 13 and wherein an adjusting means is electrically connected with said lamp for adjusting the intensity thereof in accordance with the intensity of the light at the object to be photographed.

15. The combination of claim 12 and wherein an adjusting means is electrically connected with said lamp for adjusting the intensity thereof in accordance with the intensity of the light at the object which is photographed, said adjusting means including a second photosensitive means for receiving light from the object which is to be photographed and a circuit connecting said second photosensitive means to said lamp for adjusting the intensity of the light provided by the latter in accordance with the intensity of the light at the object which is photographed.

* * * * *

UNITED STATES PATENT OFFICE
CERTIFICATE OF CORRECTION

Patent No. 3,800,683      Dated April 2, 1974

Inventor(s) Tsukumo Nobusawa

It is certified that error appears in the above-identified patent and that said Letters Patent are hereby corrected as shown below:

In the heading, the name of the assignee should be:

Asahi Kogaku Kogyo Kabushiki Kaisha

Signed and sealed this 29th day of October 1974.

(SEAL)
Attest:

McCOY M. GIBSON JR.
Attesting Officer

C. MARSHALL DANN
Commissioner of Patents